United States Patent
Gilani et al.

(10) Patent No.: US 10,726,146 B2
(45) Date of Patent: Jul. 28, 2020

(54) DATA CUSTODIAN MODEL AND PLATFORM FOR PUBLIC CLOUDS

(71) Applicant: SAP SE, Walldorf (DE)

(72) Inventors: Syed Wasif Ur Rehman Gilani, Cupertino, CA (US); Keith Klemba, Palo Alto, CA (US); Jan Loefstrand, Hillsborough, CA (US); Thomas Lee, San Francisco, CA (US)

(73) Assignee: SAP SE, Walldorf (DE)

(*) Notice: Subject to any disclaimer, the term of this patent is extended or adjusted under 35 U.S.C. 154(b) by 156 days.

(21) Appl. No.: 15/979,772

(22) Filed: May 15, 2018

(65) Prior Publication Data

US 2018/0336361 A1    Nov. 22, 2018

Related U.S. Application Data

(60) Provisional application No. 62/506,753, filed on May 16, 2017.

(51) Int. Cl.
*G06F 21/62* (2013.01)
*G06Q 30/00* (2012.01)

(52) U.S. Cl.
CPC ....... *G06F 21/6218* (2013.01); *G06Q 30/018* (2013.01)

(58) Field of Classification Search
CPC .......................... G06F 21/6218; G06Q 30/018
See application file for complete search history.

(56) References Cited

U.S. PATENT DOCUMENTS

| | | |
|---|---|---|
| 8,145,468 B2 | 3/2012 | Fritzsche et al. |
| 8,276,112 B2 | 9/2012 | Fritzsche et al. |
| 8,457,996 B2 | 6/2013 | Winkler et al. |
| 8,862,493 B2 | 10/2014 | Fritzsche et al. |
| 9,542,165 B2 | 1/2017 | Winkler et al. |
| 9,600,666 B1 * | 3/2017 | Harter ................. H04L 63/1433 |
| 10,057,184 B1 * | 8/2018 | Prahlad ............... H04L 41/0869 |
| 10,289,633 B1 * | 5/2019 | Reiner ................. G06F 16/283 |
| 10,467,426 B1 * | 11/2019 | Esposito ........... G06F 16/24564 |

(Continued)

OTHER PUBLICATIONS

Johnson et al; "Compliance with data protection laws using Hippocratic Database active enforcement and auditing", 2007, IBM Systems Journal, vol. 46, No. 2, pp. 255-264. (Year: 2007).*

*Primary Examiner* — Matthew Smithers
(74) *Attorney, Agent, or Firm* — Fish & Richardson P.C.

(57) ABSTRACT

Implementations are directed to providing a data custodian region within a public cloud, the data custodian region being specific to a customer of an enterprise having services hosted on the public cloud, the public cloud including regional data centers, through which customer data passes and/or is stored, each data center being at a location within a region, storing at least one union definition that is used to control access, transfer, and storage of customer data within respective regional data centers, the at least one union definition being provided by a data custodian associated with the customer, monitoring a plurality of actions of respective workflows executed using the one or more computer-implemented services hosted on the public cloud, for each action, logging a data event within a repository of the data custodian region, and determining whether the data event complies with the at least one union definition.

17 Claims, 11 Drawing Sheets

(56) References Cited

U.S. PATENT DOCUMENTS

| | | | |
|---|---|---|---|
| 2008/0148346 A1* | 6/2008 | Gill | H04L 63/1408 726/1 |
| 2010/0324952 A1* | 12/2010 | Bastos | G06Q 10/00 705/7.28 |
| 2011/0112973 A1* | 5/2011 | Sanghvi | G06Q 10/10 705/317 |
| 2011/0112974 A1* | 5/2011 | Hinton | G06Q 10/06 705/317 |
| 2011/0265060 A1 | 10/2011 | Fritzsche et al. | |
| 2011/0289588 A1* | 11/2011 | Sahai | G06Q 90/00 726/25 |
| 2012/0011077 A1* | 1/2012 | Bhagat | G06F 21/554 705/317 |
| 2012/0047178 A1* | 2/2012 | Raghavendra | G06Q 10/00 707/791 |
| 2013/0246105 A1 | 9/2013 | Winkler et al. | |
| 2014/0013434 A1* | 1/2014 | Ranum | H04L 63/145 726/24 |
| 2014/0025593 A1* | 1/2014 | Dolin | G06Q 30/018 705/317 |
| 2016/0254943 A1* | 9/2016 | Maes | H04L 41/0893 709/224 |
| 2017/0019314 A1* | 1/2017 | Chieu | H04L 41/5054 |
| 2017/0041454 A1* | 2/2017 | Nicholls | H04L 67/16 |
| 2017/0142157 A1* | 5/2017 | Cao | H04L 63/20 |
| 2017/0193239 A1* | 7/2017 | Chari | G06F 21/604 |
| 2017/0230419 A1* | 8/2017 | Prafullchandra | H04L 63/20 |
| 2017/0237747 A1* | 8/2017 | Quinn | H04L 63/107 726/29 |

\* cited by examiner

| Definition of Union-035 | Data Placement | Data Movement | Data Key-Mgmt | Data Processing | User Access | Private Compute |
|---|---|---|---|---|---|---|
| Berkeley County, South Carolina | | x | | | | |
| Council Bluffs, Iowa | | x | | | | |
| Douglas County, Georgia | | x | | | | |
| Jackson County, Alabama | | x | | | | |
| Lenoir, North Carolina | | x | | | | |
| Mayes County, Oklahoma | | x | | | | |
| Montgomery County, Tennessee | | x | | | | |
| Quilicura, Chile | | x | | | | |
| The Dalles, Oregon | x | x | | | | |
| Changhua County, Taiwan | x | x | | | | |
| Singapore | x | x | | | | |
| Dublin, Ireland | x | x | | | x | |
| Eemshaven, Netherlands | x | x | | | x | |
| Hamina, Finland | x | x | | | x | |
| St Ghislain, Belgium | x | x | | | x | |
| Frankfurt, Germany* | x | x | x | x | x | |
| Waldorf, Germany (Data Custodian)* | x | x | x | x | x | x |

FIG. 4A

| Compliance Report for Union-035 | Data Placement | Data Movement | Data Key-Mgmt | Data Processing | User Access | Private Compute |
|---|---|---|---|---|---|---|
| Berkeley County, South Carolina | o | | | | | |
| Council Bluffs, Iowa | | x | | | | |
| Douglas County, Georgia | | x | | | | |
| Jackson County, Alabama | | x | | | | |
| Lenoir, North Carolina | | x | | | | |
| Mayes County, Oklahoma | | x | | | | |
| Montgomery County, Tennessee | | x | | | | |
| Quilicura, Chile | | x | | | | |
| The Dalles, Oregon | x | x | | o | o | |
| Changhua County, Taiwan | | x | | | | |
| Singapore | | x | | | | |
| Dublin, Ireland | x | x | | | x | |
| Eemshaven, Netherlands | x | x | | | x | |
| Hamina, Finland | x | x | | | x | |
| St Ghislain, Belgium | x | x | | | x | |
| Frankfurt, Germany* | x | x | x | x | x | |
| Waldorf, Germany (Data Custodian)* | x | x | x | x | x | x |

| Union-035 (Data Key-Mgmt) | Workflow 1 Action 1 | Workflow 1 Action 2 | Workflow 1 Action 3 | Workflow 1 Action 4 | Workflow 1 Action 5 |
|---|---|---|---|---|---|
| Berkeley County, South Carolina | | | | | |
| Council Bluffs, Iowa | | | | | |
| Douglas County, Georgia | | | | | |
| Jackson County, Alabama | | | | | |
| Lenoir, North Carolina | | | | | |
| Mayes County, Oklahoma | | | | | |
| Montgomery County, Tennessee | | | | | |
| Quilicura, Chile | | | | | |
| The Dalles, Oregon | | | | | |
| Changhua County, Taiwan | | | | | |
| Singapore | | | | | |
| Dublin, Ireland | | | | | |
| Eemshaven, Netherlands | | | | | |
| Hamina, Finland | | | | | |
| St Ghislain, Belgium | | | | | |
| Frankfurt, Germany* | X | X | X | X | X |
| Waldorf, Germany (Data Custodian)* | | | | | |

FIG. 4C

| Compliance Report for Union-035 | Data Placement | Data Movement | Data Key-Mgmt | Data Processing | User Access | Private Compute |
|---|---|---|---|---|---|---|
| Berkeley County, South Carolina | | | | | | |
| Council Bluffs, Iowa | | x | | | | |
| Douglas County, Georgia | | x | | | | |
| Jackson County, Alabama | | x | | | | |
| Lenoir, North Carolina | | x | | | | |
| Mayes County, Oklahoma | | x | | | | |
| Montgomery County, Tennessee | | x | | | | |
| Quilicura, Chile | | x | | | | |
| The Dalles, Oregon | x | x | | | | |
| Changhua County, Taiwan | | x | | | | |
| Singapore | | x | | | | |
| Dublin, Ireland | x | x | | | x | |
| Eemshaven, Netherlands | x | x | | | x | |
| Hamina, Finland | x | x | | | x | |
| St Ghislain, Belgium | x | x | | | x | |
| Frankfurt, Germany* | x | x | x | x | x | |
| Waldorf, Germany (Data Custodian)* | x | x | x | x | x | x |

FIG. 4D

DATA CUSTODIAN MODEL AND PLATFORM FOR PUBLIC CLOUDS

CROSS-REFERENCE TO RELATED APPLICATIONS

This application claims priority to U.S. application Ser. No. 62/506,753 filed on Mar. 16, 2017, and is a application of U.S. application Ser. No. 62/506,756 filed on Mar. 16, 2017, the disclosures of which are expressly incorporated herein by reference in their entireties for all purposes.

BACKGROUND

Enterprises use cloud-computing infrastructures to perform operations and provide enterprise services to their customers. For example, the cloud-computing infrastructures host computer-executed services, data storage, data access, and the like. Example cloud-computing infrastructures include those provided by third-party cloud providers, each of which provides what can be generally referred to as a public cloud. The term public cloud can refer to a cloud platform that is generally available to multiple users, and/or enterprises. Managing governance, risk, and compliance (GRC) can be a challenging exercise for an enterprise that has its services hosted in a public cloud. Additionally, the global footprint of public clouds significantly expands the scope of regional risk and compliance issues.

Public cloud service providers aim to comply with standards and regulations, but there is a need to provide greater transparency to be able to detect unexpected data access, and to ensure that data resides within the geographical boundaries as is required by customers. Besides transparency various controls are needed that can influence the access, movement, placement, and processing of data. Often the approach to satisfy enterprise concerns about GRC has been to use an isolated private cloud built and run either by the enterprise itself, or an independent regionally trusted third party, which monitors access, and safeguards data protection for enterprise customer data residing in public clouds. Such private clouds are considerably scaled-back and out-of-sync with respect to current public cloud service offerings.

SUMMARY

Implementations of the present disclosure include computer-implemented methods for a data custodian model, and data custodian platform for public clouds. In some implementations, actions include providing a data custodian region within an infrastructure of a public cloud, the data custodian region being specific to a customer of an enterprise having one or more computer-implemented services hosted on the public cloud, the infrastructure including a plurality of regional data centers, through which customer data passes and/or is stored, each data center being at a location within a region, storing at least one union definition that is used to control one or more of access, transfer, and storage of customer data within respective regional data centers, the at least one union definition being provided by a data custodian associated with the customer, monitoring a plurality of actions of respective workflows executed using the one or more computer-implemented services hosted on the public cloud, for each action, logging a data event within a repository of the data custodian region, and determining whether the data event complies with the at least one union definition. Other implementations of this aspect include corresponding systems, apparatus, and computer programs, configured to perform the actions of the methods, encoded on computer storage devices.

These and other implementations can each optionally include one or more of the following features: actions further include, in response to determining that the data event does not comply with the at least one union definition, providing a notification to a data custodian through a data custodian portal; the data custodian portal communicates with the repository through a computer-executed connector of the data custodian region; the repository is a customer log repository that receives data events from a log repository of a respective computer-implemented service; actions further include providing, within the data custodian region, a zone exclusively accessed by the data custodian; one or more of private computing, and data key management are executed within the zone; and the at least one union definition is further used to control one or more of processing of customer data, data key management, and private computing within respective regional data centers.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 4A-4D depict example tables in accordance with implementations of the present disclosure.

Like reference symbols in the various drawings indicate like elements.

DETAILED DESCRIPTION

Implementations of the present disclosure are generally directed to a data custodian platform based on a data custodian model. More particularly, implementations of the present disclosure are directed to a data custodian platform that manages governance, risk, and compliance (GRC) for enterprises with services hosted in public clouds. As described in further detail herein, implementations of the present disclosure provide a data custodian model (DCM) that enables independently configurable transparency, and controls to achieve a level of GRC for data access and data sovereignty that enterprise customers require.

Implementations can include actions of providing a data custodian region within an infrastructure of a public cloud, the data custodian region being specific to a customer of an enterprise having one or more computer-implemented services hosted on the public cloud, the infrastructure including a plurality of regional data centers, through which customer data passes and/or is stored, each data center being at a location within a region, storing at least one union definition that is used to control one or more of access, transfer, and storage of customer data within respective regional data centers, the at least one union definition being provided by a data custodian associated with the customer, monitoring a plurality of actions of respective workflows executed using the one or more computer-implemented services hosted on the public cloud, for each action, logging a data event within a repository of the data custodian region, and determining whether the data event complies with the at least one union definition.

Figure 1A:
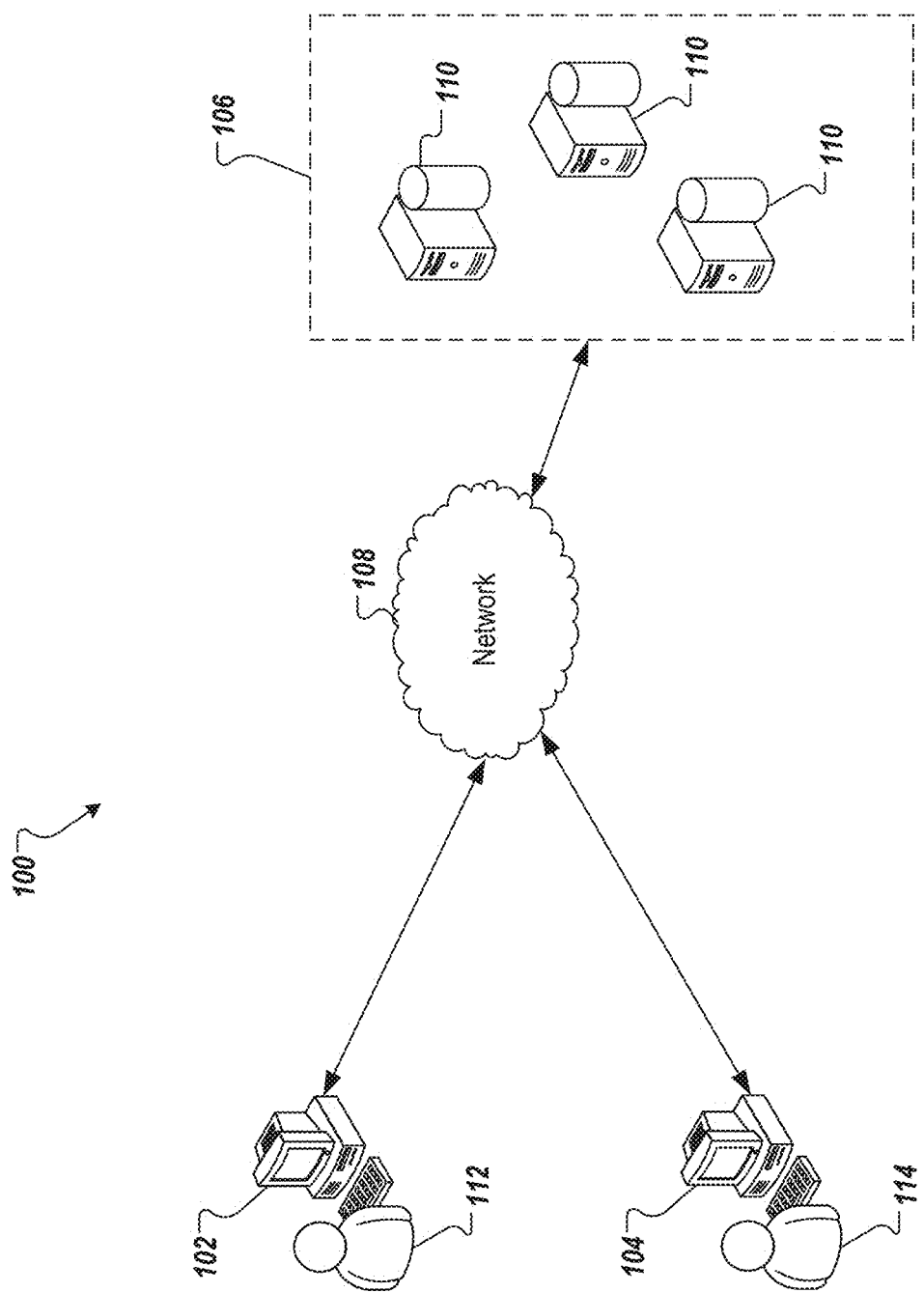
FIG. 1A depicts an example architecture that can be used to execute implementations of the present disclosure.

FIG. 1A depicts an example architecture 100 that can be used to execute implementations of the present disclosure. In the depicted example, the example architecture 100 includes one or more client devices 102, 104, a server system 106 and a network 108. The server system 106 includes one or more server devices 110. In the depicted example, a user 112 interacts with the client device 102, and a user 114 interacts with the client device 104. In an example context, the users 112, 114 can include users, who interact with one or more enterprise services that are hosted by the server system 106.

In some examples, the client devices 102, 104 can communicate with one or more of the server devices 108 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 108 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 110 includes at least one server and at least one data store. In the example of FIG. 1A, the server devices 110 are intended to represent various forms of servers including, but not limited to a web server, an application server, a proxy server, a network server, and/or a server pool. In general, server systems accept requests for application services and provides such services to any number of client devices (e.g., the client devices 102, 104) over the network 108.

In accordance with implementations of the present disclosure, the server system 106 can provide a public cloud infrastructure. More particularly, the server system 106 can provide a cloud-computing infrastructure that can host computer-executed services offered by one or more enterprises to their customers. In the context of the present disclosure, the cloud-computing infrastructure can be a public cloud that is provided by a third-party cloud provider. Example third-party cloud providers include Amazon.com, Inc., which provides the Amazon Web Services (AWS) cloud-computing platform, Google, Inc., a subsidiary of Alphabet, Inc., which provides the Google Cloud Platform, and Microsoft, Inc., which provides the Azure cloud-computing platform.

Although a single server system 106 is depicted, it is contemplated that multiple server systems 106, each provided by a respective third-party cloud provider, can be provided. For example, an enterprise can have its services hosted on a public cloud, or multiple public clouds.

In accordance with implementations of the present disclosure, the user 112 can be an agent (e.g., administrator, developer) of an enterprise that has computer-executed services hosted on one or more public clouds (e.g., a public cloud provided by the server system 106). The user 114 can be an agent (e.g., cloud security analyst, risk compliance officer (RCO)) of a customer of the enterprise, which customer uses the computer-executed services hosted on one or more public clouds.

Implementations of the data custodian platform of the present disclosure are described in further detail herein with reference to example concepts. In some examples, a user is an account used to access the data custodian platform. Users are created, updated, and removed by a project administrator using a user management endpoint. Users may belong to one or more projects. Users have permissions to allow or restrict access to various resources. In some examples, a project logically groups data custodian objects related to an enterprise (customer). Unions, regions, logs, alerts, and subscriptions belong to a project. Projects have a list of users that can access the project. Projects are created by the system administrators during customer onboarding. A project administrator user is assigned to the project during customer onboarding.

In some examples, one or more logs are provided by the data custodian platform. Logs are analyzed to extract the multiple characteristics. Example characteristics include, without limitation, operation, location (e.g., filterable based on regions), resource, time, and principal. In some examples, a union is a set of policies. A union may be enabled, or disabled. Unions may not be modified. Instead new versions are created. Only one version of a union may be enabled at a given time. If a union references another versioned object that is updated, the union may also have its version updated.

In some examples, a policy is matched against a set of logs, and specifies a response, and a risk. The response includes at least one action. Example actions include, without limitation, allow, warn, and deny. In some examples, logs are matched by specifying a number of filters. In some examples, all filters within a policy must match for the policy response to be triggered. For one or more actions, a severity can be indicated. Example severities include, without limitation, lowest, low medium, high, and highest. For example, for warn and deny actions, any of the example severities can be selected. In some examples, for an allow action, none is indicated for severity. In some examples, a filter matches against one or more properties of a log. Filters can also inverse match against properties (e.g., matching logs not generated by a specified operation).

In some examples, a region is a logical grouping of locations, and/or regions. Regions are used for matching against sets of locations. In some examples, the data custodian platform provides a defined set of regions (e.g., default). In some examples, users can define regions. Regions cannot be modified. Instead new versions are created. For example, if a region references a region that is updated (e.g., the referenced region being a parent region), a new version of the referenced region will also be created.

In some examples, an alert occurs when a policy is matched with a warn, or deny action. The alert records the log, union, and policy that it was raised by. In some examples, a subscription enables notifications to be sent for alerts raised by unions, or policies. Subscriptions specify a set of policies whose alerts should result in notifications. Subscriptions specify a set of targets, and transports for notifications to be pushed to a data custodian user when the subscribed alerts occur.

To provide further context for implementations of the present disclosure, migration to the cloud is inevitable once an enterprise realizes the significant benefit of using a public cloud. Many of the available top-tier public clouds are enterprise-ready, and application rich with both Infrastructure-as-a-Service (IaaS), and Platform-as-a-Service (PaaS) offerings. However, when an enterprise decides to move its applications to the public cloud, it loses physical access to the infrastructure hosting its information and customer data. A key concern of enterprises is to retain complete control and transparency of how their sensitive data is accessed, handled, and processed on public cloud platforms, while at the same time benefiting from the agility, scale and global presence of a public cloud platform. The impact that an unauthorized access can have is considerable, given their level of access and ability to infiltrate enterprises and assets. Brand damage, financial impact, and productivity losses are just some of the ways a malicious access can affect an operation. The enterprise must find a way to establish the trust that is necessary to ease the concerns of their customers, and ensure that proper GRC procedures are being followed at all times (e.g., they have not been preempted by a recent system update).

Public cloud compliance with industry standards and regulations are posted by auditors for all potential customers. To increase the level of trust above and beyond simple compliance, enterprise customers need solutions that increase transparency and control sufficient to demonstrate to internal and external stakeholders that data has been handled and accessed in accordance with policies, and/or regulations. One way to satisfy enterprise concerns around data handling is by isolation. Isolation could be accomplished by building a private cloud that can be run either by the enterprise or an independent, regionally trusted third party. Such private clouds, however, tend to be considerably scaled back versions of full public cloud service offerings. One strength of a public cloud is the resiliency made possible by replication and migration across zones and regions to ensure high availability. The idea of isolation to gain trust comes at the cost of global presence, and high availability. Accordingly, a goal for developing a public cloud solution for enabling GRC management must include preserving, as much as possible, the full strength of the global public cloud features. Going beyond transparency, additional measures of GRC control are needed so that an enterprise is able to influence the systematic movement, placement, and execution of computation and data.

In view of this, and as introduced above, implementations of the present disclosure provide a data custodian platform based on a DCM. In some implementations, the DCM addresses the core needs of data sovereignty compliance, data transparency and control for enterprise customers, while preserving the collective global strength of public clouds. The DCM provides independent visibility and control to configure the level of GRC for data access and sovereignty to meet each enterprise customer requirements. This is a step towards empowering enterprise customers with complete visibility and control over their data storage location, data movement and data processing locations, and access to their sensitive data within one or more public clouds.

In some implementations, a third-party public cloud provider offers the DCM features in all regions (e.g., globally), and continues to design-build-run datacenters as its primary role. A data custodian (e.g., a customer of an enterprise) is provided access to a customer log repository (CLR), which contains audit logs revealing all types of accesses made to the customer data (e.g., human accesses made from the customer side and/or the public cloud provider side, machine accesses). In some examples, customers grant third-parties (e.g., a third-party data custodian) access to their logs so that the data custodian is able to review and analyze these logs on the customer's behalf. The public cloud provider exposes an application program interface (API) for access to the CLR on behalf of the customer.

As described in further detail herein, the data custodian-based solution of the present disclosure enables producing GRC access transparency reports, running continuous GRC risk analysis, and activating GRC controls for public cloud services. Further, a number of templates can be provided for commonly requested definitions, reports, and analytics.

In some implementations, a separate data custodian zone (DCZ) is provided within a public cloud provider region to support trusted data custodian functions. An example trusted function includes (third-party) encryption key management (EKM). In some implementations, all public cloud provider regions that want to offer data custodian functionality must specifically support DCZs within their selected regions.

In the DCM of the present disclosure, customers always own their data and access to their data. The pubic cloud provider provides all of the physical and logical (digital) security capabilities, and procedures for policy enforcement. These capabilities can be configured as data custodian controls by the customer with or without the help of a trusted third-party acting as the data custodian. An example tenet of the DCM is verification that requires transparency of the mechanisms, and processes to be able to distinguish between normal and abnormal workflows. The data custodian does the task of processing all types of access logs including audit logs, which capture all types of accesses, human and machine, made to the customer data. Additionally, the data custodian is provided with specialized, insider access logs by the public cloud provider that capture all types of accesses made from the public cloud provider side to the customer data, and customer infrastructure (for example, admin accesses, support team accesses, etc.) for various reason including support activities. The data custodian is responsible for handling and processing large amounts of transparency information (e.g., logs, statistics, etc.), and, for example, developing machine-learning pattern recognition to detect and report all type of accesses and anomalies happening to the customer data.

As described in further detail herein, there are multiple data custodian controls that require active data custodian operational involvement. Examples of this include providing trusted third-party key-encrypting-key (KEK) support, and providing private computing.

Figure 1B:
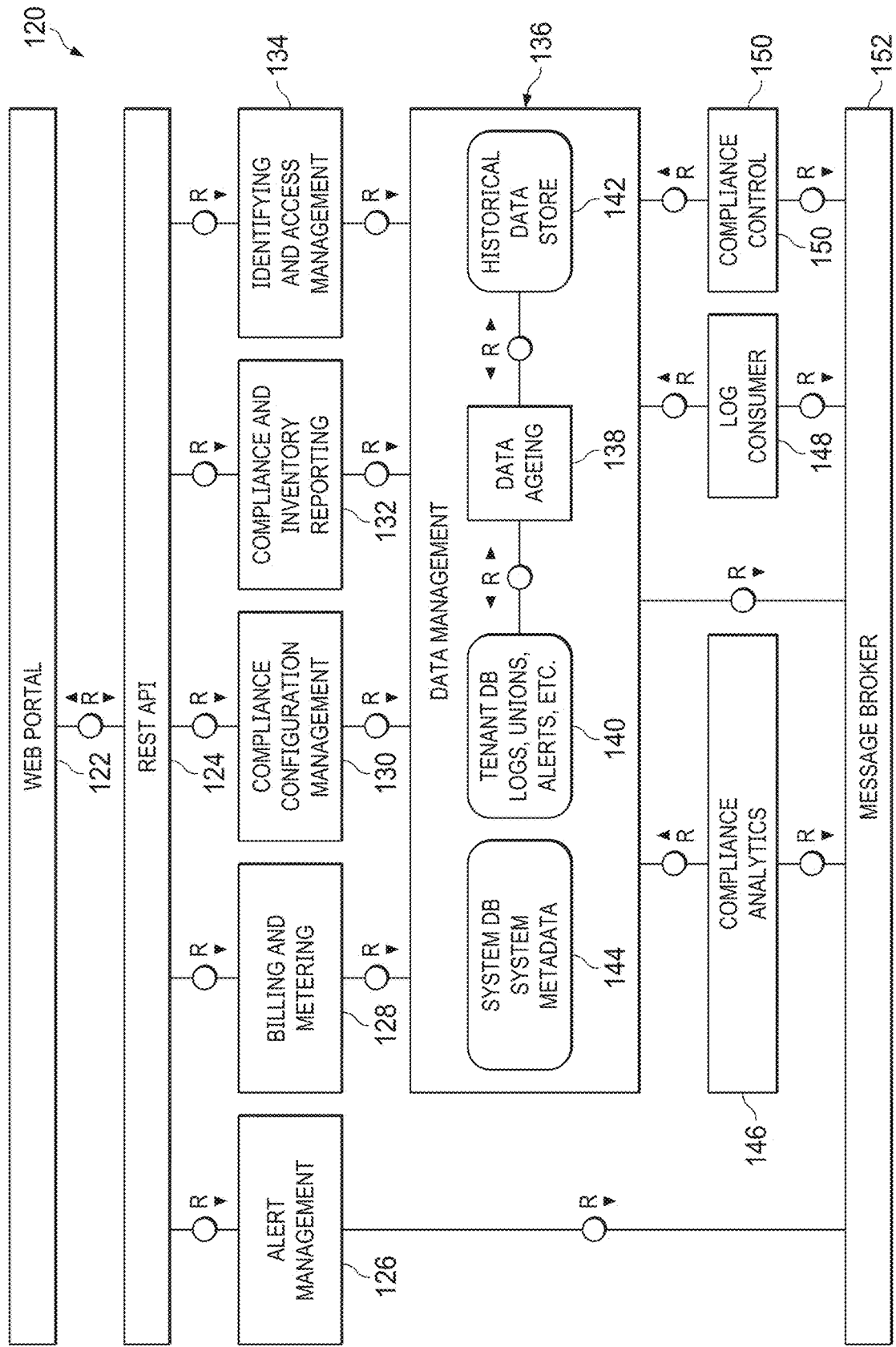
FIG. 1B depicts an example general conceptual architecture in accordance with implementations of the present disclosure.

FIG. 1B depicts an example general conceptual architecture 120 in accordance with implementations of the present disclosure. A portal 122 is the main access point to the data custodian platform for users. In some examples, the portal 122 is provided as a web-based portal that is accessed through a browser application executed on a computing device (e.g., the client device 102 of FIG. 1A). In some examples, the portal 122 provides one or more UIs that enable users to define unions, regions, and subscriptions, and visualizations of alerts, service usage, and inventory data. In some examples, the portal 122 provides one or more UIs for administrative actions (e.g., user management). A REST API 124 interfaces services of the data custodian platform, and exposes the services for consumption through the portal 122.

An alert management service 126 enables defining, controlling, and querying of user subscriptions to policies. In this manner, alerts can be selectively sent through user-specified channels (e.g., email, text). The alert management service 126 also enables querying of alerts. For example, a user can submit a query through the portal 122, which query is provided to the alert management service 126. A response to the query can be provided. A billing/metering service 128 enables reporting on the service usage of the data custodian platform. A compliance configuration management (CCM) service 130 enable allows defining and querying of unions, and regions. A compliance and inventory reporting (CIR) service 132 enables querying of logs, resources, and locations. An identity and access management (IAM) service 134 coordinates authentication of users, and logging users into the data custodian platform, as well as establishing access rights for respective users.

In the example of FIG. 1B, a data management layer 136 is provided. In some examples, the data management layer 136 implements an ORM layer, exposing an object-oriented approach to data access. A data ageing component 138 phases out old data from one or more tenant databases 140 into a historical data store 142. That is, data in a tenant database 140 that is older than a threshold age is migrated from the tenant database 140 to the historical data store 142, unless otherwise marked to remain in the tenant database 140. In some examples, the tenant database 140 stores data models for respective projects. A system database 144 stores system metadata, such as a set of projects, a set of users, and which projects a user is a member of.

In accordance with implementations of the present disclosure, the one or more tenant databases 140 are provided within a first database system, and the historical data store 142 is provided within a second database system. In some examples, the first database system is a higher performing database system relative to the second database system. For example, the first database system can be provided as an in-memory database system (e.g., SAP HANA provided by SAP SE of Walldorf, Germany), while the second database system is not in-memory (e.g., is a disk-based system).

In some examples, a compliance analytics service 146 processes logs against the defined policies to determine breaching events (e.g., occurrences that violate a policy). A log consumer service 148 processes raw logs (e.g., received from a cloud service provider), and transforms the raw logs into a suitable internal format, and exposes the logs for further processing. A compliance control service 150 executes functions to take corrective actions on the cloud provider side, when policy violations are discovered. A message broker 152 enables internal communication between services, and/or components within the data custodian platform.

Figure 1C:
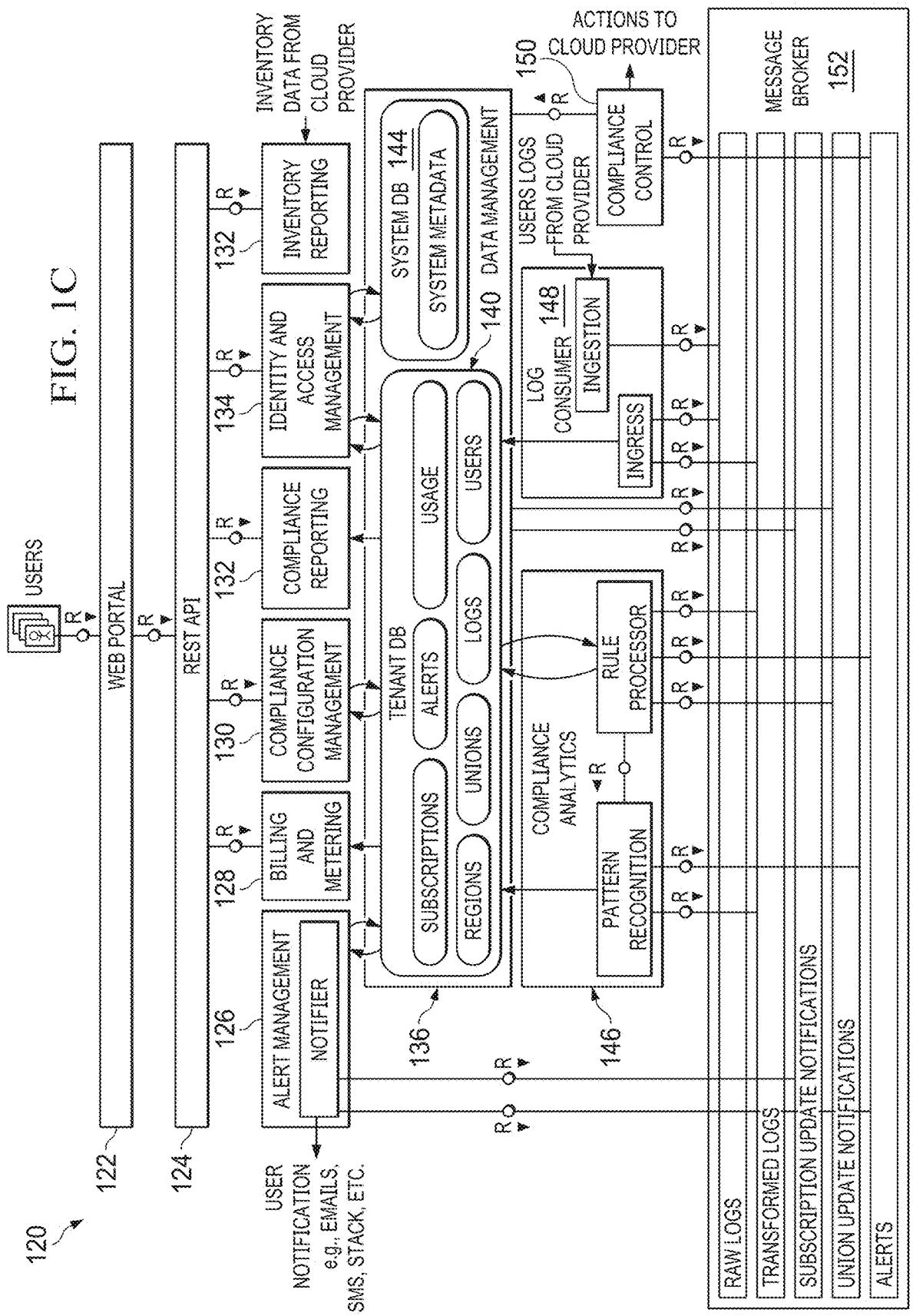
FIG. 1C depicts an example detailed conceptual architecture in accordance with implementations of the present disclosure.

FIG. 1C depicts the example conceptual architecture 120 in further detail. In the examples of FIG. 1C, the log consumer 148 captures the logs from the cloud provider through an ingestion component. In some examples, the ingestion component redirects the received logs to a raw logs messaging queue topic. An ingress component of the log consumer 148 reads the raw logs from this topic, and transforms the raw logs into a suitable internal format that can be used by other components of the data custodian platform. The ingress component writes the transformed logs to a dedicated topic, to synchronize other components, as well as into the tenant database.

In some examples the compliance analytics service 146 includes a rule processing component, and a pattern recognition component. The rule processing component processes log events against the defined policies as they come into the transformed logs topic. The rule processing component selectively raises alerts by writing to an alert topic, and writes to the tenant database 140. The pattern recognition component inspects log events, alerts, and policies to discover possible policy breaching patterns. In some examples, the alert management service 126 uses a notifier component that specifically reads topics from the message broker 152 including subscriptions update notifications, and alerts, to send out notifications to users according to their specified channels (e.g. emails, SMS, Slack channels, etc.).

Figure 2:
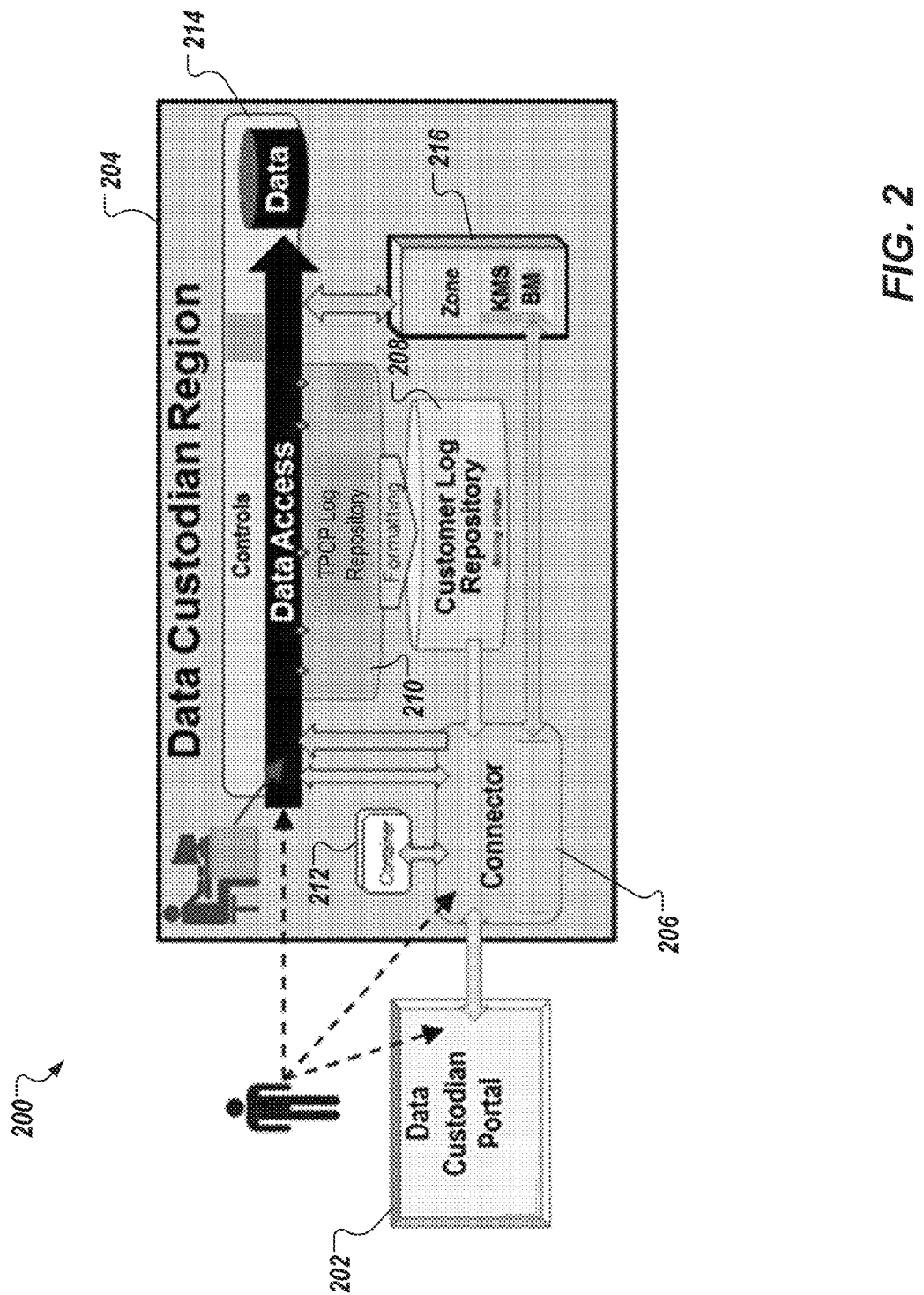
FIG. 2 depicts an example conceptual architecture in accordance with implementations of the present disclosure.

FIG. 2 depicts an example conceptual architecture 200 in accordance with implementations of the present disclosure. The example conceptual architecture 200 of FIG. 2 can be referred to as a data custodian architecture. In the depicted example, the example conceptual architecture 200 includes a data custodian portal 202, and a data custodian region 204. An example data custodian portal is described in detail in commonly assigned U.S. Prov. App. No. 62/506,756, filed on May 16, 2017, and entitled Data Custodian Portal for Public Clouds, the disclosure of which is expressly incorporated herein by reference in the entirety for all purposes. In some examples, the data custodian region 204 is provided as at least a portion of a public cloud that is assigned to a data custodian (e.g., enterprise), and within which the data custodian can implement union-based controls, described in further detail herein.

In some implementations, the conceptual architecture 200 of FIG. 2 is based on services. In some examples, the public cloud provider infrastructure and application services are billed by the public cloud provider at a contracted rate with the customer (and/or enterprise).

In the depicted example, the data custodian region 204 includes a connector 206 that supports both transparency and control aspects of the DCM. In some examples, the connector 206 is provided as a licensed software package. In some examples, the customer pays for resources consumed by the connector 206. In some examples, although the connector 206 supports a basic command line interface, the connector 206 also supports an API for the DCP 202 (e.g., on the data custodian side).

In some examples, the DCP 202 is a data custodian provided, value added service that would have costs associated with it depending on how it is bundled with other data custodian support services (e.g., Max Attention, One Support). The DCP 202 may also include integration with other application level GRC support for enterprise applications, which is already available (e.g., SAP GRC provided by SAP SE of Walldorf, Germany). The DCP 202 may include a notification function which would also have additional costs associated with notification delivery and remediation. The nature of some reports might also have premium costs associated with them. For example, if the data custodian is producing a report that is subject to reference in litigation, it might require the data custodian to certify the correctness and timing. The costs for services provided through the DCP 202 can vary depending on how the data custodian delivers the service, and the scope of the services used.

In the depicted example, the data custodian region 204 includes a CLR 208. The CLR 208 has costs that are volume and activity related as more active customer landscapes will generate more log entries requiring more processing overhead in the cloud infrastructure. In some examples, the CLR 208 is a time sequence cache for logs and costs would be related to the cache depth size selected. In some examples, the data custodian region 204 provides private computing as a managed service offered by the data custodian, and would have a separate billing arrangement with the data custodian.

The conceptual architecture of FIG. 2 further includes a log repository 210 of the third-party cloud provider, one or more containers 212, union-based controls 214, and a zone 216. In some implementations, the log repository 210 records all data-related events described herein (e.g., access, movement, processing), and provides log data to the CLR 208. In some implementations, a container 212 can be provided to support processing of event data. For example, a data analytics application can be hosted in a container 212 to provide real-time analysis of event data. In some examples, and as described in further detail herein, the zone 216 enables third-party KMS, and/or private computing on the public cloud. The zone 216 can be described as a separate data custodian secured area in the data center(s) of the public cloud, and is separate from access and influence by the public cloud provider. In accordance with implementations of the present disclosure, the controls 214 are union-based controls, which enable a data custodian to define availability of respective functions across regional data centers of the public cloud. Union-based controls are described in further detail herein.

Figure 3:
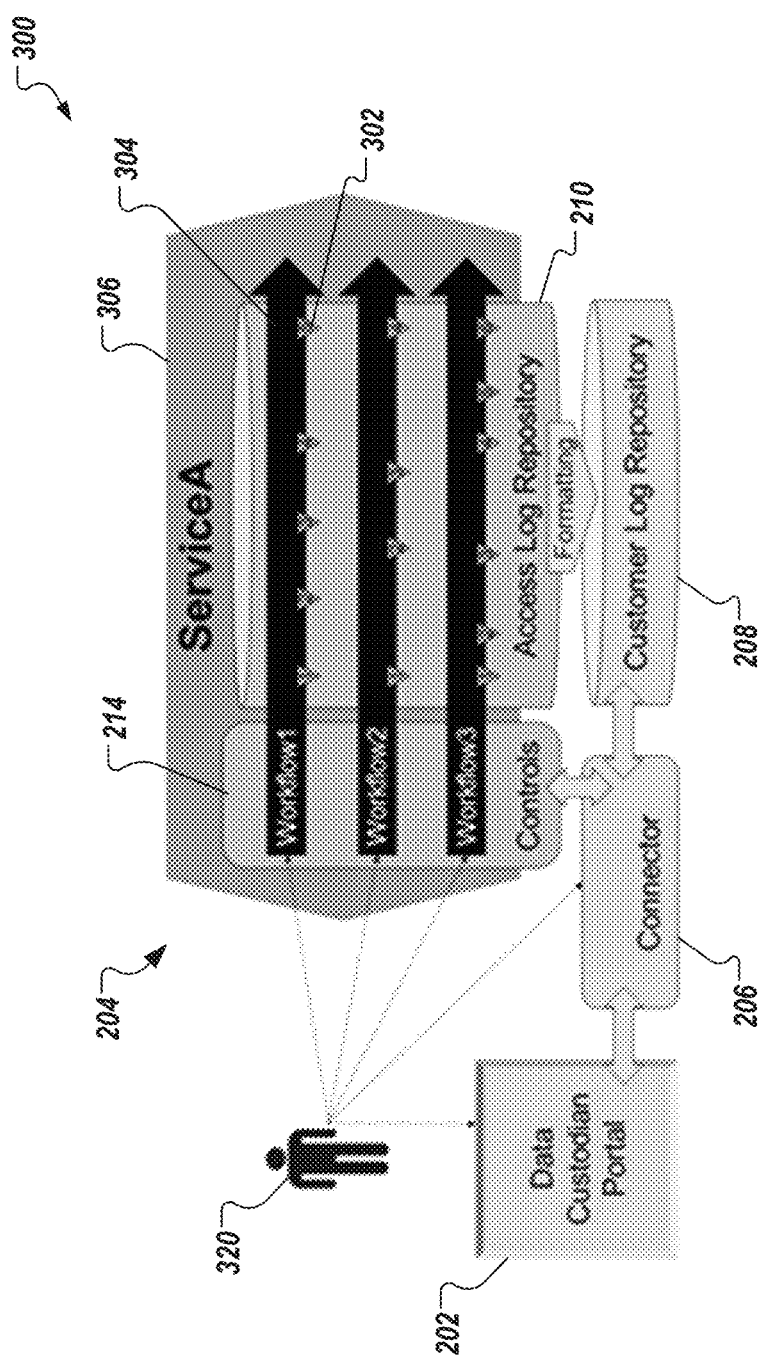
FIG. 3 depicts an example data custodian architecture in accordance with implementations of the present disclosure.

FIG. 3 depicts an example data custodian architecture 300 in accordance with implementations of the present disclosure. In general, the example data custodian architecture 300 is a granular view of the example conceptual architecture 200 of FIG. 2. For example, the example data custodian architecture 300 includes the DCP 202, the data custodian region 204, the connector 206, and the CLR 208.

In accordance with implementations of the present disclosure, transparency is focused on actions 302 within workflows 304 within a service 306 of a public cloud provider. An example service can include a data storage service, and example workflows within that service can include read/write to a file, copy/move file, and create/delete file. Along each workflow within a service, there are one or more actions that generate log entries in an access log repository (ALR) (an ALR 210 of FIG. 2).

In the example of FIG. 3, a customer 320 accesses data using the service 306 (ServiceA) provided by the public cloud provider. An example workflow 304 can include a read/write to a file workflow (Workflow1). Along Workflow1, there are multiple actions, which generate a pattern of log entries to the ALR 210 as the customer traverses the workflow. Periodically, relevant workflow action logs in the ALR 210 are formatted and cached into the CLR 208, where they become available for analysis and review by the data custodian through the connector 206.

Using the DCP 202, the customer 320 is able to link to the connector 206, which runs in the customer's public cloud landscape. The connector 206 enables the DCP 202 to send commands to fetch data from the CLR 208. This fetched data can be used to produce reports and analysis for, in the example of FIG. 3, ServiceA, Workflows1-3, and actions 1-6. Example reports include union compliance, and workflow risk reports based on information gathered from the CLR 208. In some examples, analysis is based on pattern consistency of workflow action logs. More complex, real-time analysis is handled by having the DCP 202 launch analysis software in a container (e.g., a container 212 of FIG. 2) linked to the connector 206.

In some examples, the CLR 208 is part of the customer's public cloud landscape. A log retention period of the CLR 208 is specified by the customer. Data fetched from the CLR 208 is formatted into interim reports designed to enable combining interim reports to support long duration reports and analysis. There can be thousands of log entries that are simply saying that everything is working as expected, and as such, are not particularly interesting (e.g., other than establishing the "normal" pattern). It is the detection of an exception in the workflow action pattern that is interesting, and how it might relate to other workflow exceptions becomes the focus of an analysis.

Providing transparency without control leaves the user in a state of awareness without any ability to resolve or prevent GRC issues. In describing the transparency component of the DCM, so-called union association attributes, which are described in further detail herein, provide the basis of the controls available in the DCM. With reference to FIGS. 2 and 3, controls 214 are depicted. In some examples, the controls 214 are configured using the DCP 202, and are delivered to the public cloud infrastructure through the connector 206. The controls 212 remain in effect for the customer until they are removed or modified. An example way to deliver controls includes activating a complete union definition, which is described in further detail herein. In some examples, controls can be individually modified and activated as desired.

One or more data custodian functions require a separate data custodian secured area in the data center that can support the functions. This secure area is depicted as a zone 216 in FIG. 2. An example function can include an independent key management system (KMS). Requiring a trusted third-party KMS is one of the union definition functions, as described in further detail herein. Accordingly, the KMS must be supported close to operations of the public cloud provider infrastructure, yet separate from access and influence by the public cloud provider. Consequently, the zone 216 is provided as an isolated area of the data center(s) provided by the public cloud provider. Besides supporting the KMS, the zone 216 can also support private computing functions (e.g., Bare Metal HANA provided by SAP SE of Walldorf, Germany).

As introduced herein, the DCM of the present disclosure enables transparency and access control in public clouds. In general, the DCM is focused on data, and, more specifically, access to customer data. The DCM and the data custodian platform provide increased transparency into the existing data access security features, and extends internal controls to better customize the specifics of an enterprise's data access policy. Accordingly, the DCM supports management of GRC for an enterprise that provides services to its customers using one or more public clouds. Enterprises are concerned about their exposure to very different regional risk and compliance issues due to the global footprint of public clouds.

Public cloud providers go through periodic audits required to show compliance to standards and regulations. However, enterprises can increase the level of trust by going above and beyond the standard audits to ensure that they, or a delegate, has the information needed to be able to demonstrate to internal and external stakeholders that data has been accessed in accordance with policies (e.g., business and/or regulatory). Besides transparency, additional measures of control are needed that influence the movement, placement, and processing of data.

The DCM provides independent transparency and control capabilities sufficient to configure the level of data access trust a customer requires. One way to begin the description of the DCM is to introduce the term "union," referenced above. A union can be described as an associated set of physical data centers. If geography were the only association attribute of a union, it would result in unions of data centers being defined based on geographic location (e.g., Global union including all data centers; Americas union including only data centers located in North, Central, and South Americas; Asia union including all data centers located in Asian countries).

However, the union association attributes provided by the DCM of the present disclosure are much more granular, and account for data access within various public cloud provider workflows. These attributes enable customers to define unions according to their business and/or compliance needs. For example, the DCM enables customers to have multiple union definitions active (e.g., one for each different service offering), and to formalize data movement between unions.

FIG. 4A depicts an example table 400 reflecting a definition of an example union (Union-035) that is been custom tailored to a specific set of requirements. In the example of FIG. 4A, the example union is defined based on example features. The example features include data placement, data movement, data key-management, data processing, user access, and private computing. In the example of FIG. 4A, the customer has indicated that moving data (encrypted transfer) through any of the regional data centers provided by the public cloud provider is allowed. However, the customer has indicated that placement of data (encrypted at rest) is only allowed in any EU region as well as in the US data center in Oregon. Further, the customer has indicated that actual data processing (e.g., decrypting to read, encrypting to write) should only take place in Germany, along with data key management. In the example of FIG. 4A, user access can be from a digital touch point in any EU data center (e.g., using a universal login provided by the public cloud provider), but users will be directed to data processing in either of the German data centers. Further, if private data processing is required (e.g., BM HANA) this would only be allowed in the Walldorf, Germany data center owned by the data custodian. In some implementations, the customer can modify the union definition(s), and/or create a new union, and request that the union(s) to be enforced by the data custodian.

FIG. 4B depicts an example table 402 reflecting an example union compliance report for the example union (Union-035) of FIG. 4A. The DCP of the present disclosure provides information about all unions orchestrated, and deployed by the customer in the public cloud per the customer's data sovereignty requirements. In some examples, the customer uses the DCP to request union compliance reports.

In the example of FIG. 4B, the green X indicates that the user's landscape is making use of the data custodian feature (column) in the region (row) indicated. The black X indicates that, although this function is allowed as part of the union definition, it not currently being used in the region indicated. The red O indicates that a function is being used in the region indicated that is not allowed based on the union definition (Union-035), and would therefore make the current landscape non-compliant. The yellow highlighted cell indicates that workflow exceptions are being detected by analysis with respect to the function and region indicated. The markings described herein, and visually depicted in FIG. 4B, are example markings, and can be substituted by any appropriate markings to provide the indication described. Further, although the example of FIG. 4B provides a tabular union compliance report, the union compliance report can be provided in any appropriate manner (e.g., graphical elements in a graphical user interface (GUI) of the DCP).

In some implementations, a workflow risk report can be provided, and is used to track workflow exceptions (e.g., exceptions appearing in a union compliance report). As indicated in the example of FIG. 4B, an exception occurs in the data key-management function in the Frankfurt, Germany Region. FIG. 4C depicts an example exception report for the data key-management feature. In the example of FIG. 4C, it is seen that there is a workflow breakdown of the data key-management function that exposes the exception to be occurring in Workflow 1, Action 3. In some examples, if there were multiple workflows for the data key-management function, they would be listed in the report and there may be action exceptions showing up in these other workflows as well. The example reports of FIGS. 4A-4C are representative of how data custodian transparency works, and the value it provides. More detailed examples are provided in commonly assigned, U.S. Prov. App. No. [to be determined], referenced above.

As described herein, implementations of the present disclosure provide union enforcement. For example, and with continued reference to the example union definition (Union-035) of FIG. 4A, a customer can activate the union using the DCP. For example, the customer can request that the union be activated using an activate command of the DCP. In response, the DCP transfers the union control attributes to the connector, which activates a corresponding set of controls in the public cloud provider infrastructure (e.g., as an atomic action). In this manner, the process of properly forming a compliant union (Union-035) for the customer's landscape is initiated. In the case of the example union, Union-035, compliance will require relocation of data-processing and data-at-rest shown in FIG. 4B as red O's. Compliance will also require establishing the necessary data custodian KMS support in the Frankfurt and Walldorf, Germany data centers. Lastly, compliance will require reserving capacity for private computing (e.g., BM) in the Walldorf, Germany data center. In some examples, successive union compliance reports can be requested until full compliance is achieved. FIG. 4D depicts an example union compliance report that can be provided after activating the example union (Union-035).

In some implementations, as controls are tightened, some global public cloud provider services and applications may have reduced functionality or be completely unavailable. For this reason, a customer can invoke different union definitions for different landscapes, and thereby tailor the tightly governed and less governed applications into a complementary solution. In some examples, a default union definition (Union-001 (Global)) can be provided, through which no data custodian functions are activated.

In some implementations, data placement refers to storing of data in one-or-more of the regions making up the global network of the public cloud provider. In some examples, this data is data-at-rest, fully encrypted, and access controlled. Although some enterprise customers may allow their encrypted data to be stored anywhere, this is not the case for every customer. Using the data placement control of the DCM of the present disclosure, an enterprise can specify the regions where their data-at-rest can be stored. Any exception where data is not being stored where it should be would show up in a union compliance report, such as those described herein. The example of FIG. 4B shows a data placement exception with a red O for South Carolina (row), Data Placement (column). The customer reason for specifying data placement can vary from recovery considerations to activity analysis risks. This is also an area where reasons can change rapidly depending on new geopolitical risk factors. For example, if a region breaks apart, a data protection standard can emerge, or each country may have different rules and regulations. Customers may wish to keep their data away from a region, in which regional laws require encryption keys be escrowed for all encrypted data-at-rest. As noted above, a default for this control can be provided (e.g., Union-001 (Global)), in which data placement allowed id anywhere.

Data movement refers to the movement of data across the private network backbone of the global public cloud provider. In some examples, moved data (data in motion) is always encrypted. In some examples, although some enterprise customers may allow their data to pass through any cloud region (e.g., to reach a data placement endpoint), it may be the case that a customer wishes to completely avoid a region, even transitionally. For such cases, the data movement control is included in the DCM of the present disclosure. Again, reasons may change over time (e.g., cross border data transfer tariffs, time-of-day congestion deterrent fees). as noted above, a default for this control can be provided (e.g., Union-001 (Global)), in which data movement is allowed anywhere.

Data privacy control refers to third-party (e.g., data custodian) KEK management. With this control activated, the key chain for the actual data encryption key is expanded to include a KEK provided by the data custodian. A data custodian KMS is provided in a secured area (e.g., the zone 216 of FIG. 2) with physical access only available to the data custodian. In some implementations, this data privacy control is carried out region-by-region, and is not a global function. A default for this control can be provided (e.g., Union-001 (Global)), in which data privacy, third-party key management NOT required anywhere.

As with the other controls, this data privacy function is fully supported by the DCP including certificate delivery of credentials and key attributes (e.g., revocation, authorization, etc.). One particular feature of this control is the ability for the customer to fully suspend the data custodian's KEK delivery participation. The effect of this action is that no user data can be decrypted or encrypted in the region affected. In this case, the data cannot be accessed by the cloud provider, the customer, the data custodian, or anyone, until the customer releases the suspension of this function. In this manner, data stored in a region that is compromised can be protected.

Data processing control refers to where data is created, deleted, modified, etc. by authorized applications. In some examples, data processing includes unencrypted (clear-text) data. In other words, the data is in clear-text following decryption, or is being generated prior to encryption. In some examples, this is the only state where the data can be processed. Consequently, control of where this can occur is included in the data custodian controls. A default for this control can be provided (e.g., Union-001 (Global)), in which data processing is allowed anywhere.

In some implementations, a control is provided for user access points to restrict an end user's digital touchpoint to public cloud platform. This is a control that aligns with requirements of regional regulations (e.g., the EU Data Privacy Law). A default for this control can be provided (e.g., Union-001 (Global)), in which user access points are allowed from anywhere.

As introduced above, implementations of the present disclosure provide for private computing control. This can be used to support a data custodian database running on larger memory servers than are available from the public cloud provider, for example. An example database system can include SAP HANA provided by SAP of Walldorf, Germany. The side benefit of this is that the data in this database is not encrypted, and is highly coded. However, the database engine surrounding the memory understands the data coding perfectly. Being able to isolate this computing function to a zone controlled by the data custodian (e.g., the zone 216 of FIG. 2) can be seen as a very strong trust builder. The data custodian zone also supports other functions, such as the KMS described above. A default for this control can be provided (e.g., Union-001 (Global)), in which private computing is NOT required anywhere.

Implementations of the present disclosure are described in further detail with reference to example use cases. In a first example use case, a US-based company (customer) includes entities (e.g., subsidiaries) located in the EU. In this example, the customer would like to move their on-premise logistics solution to a public cloud provided by a public cloud provider. The customer's database contains considerable amounts of personal information of buyers and contractors that falls under regional regulatory controls. Prior to moving to the public cloud, the customer deals with this by having separate data centers in the US and the EU. EU summary reports (without personal details) are regularly sent to the US headquarters. To support this landscape in the public cloud, features of the DCM of the present disclosure are implemented. For example, the customer can define two Unions, one for the EU (Union-EU), and one for the US (Union-US). The customer would run their logistic software in each union.

In the first example use case, the Union-EU is defined, such that data placement, data processing, and user access are only allowed in the EU regions, but that data movement can occur across any region (e.g., US and/or EU). On the other hand, the Union-US is defined, such that data placement, data processing, and user access are only allowed in the US regions, but that data movement can occur across any region (e.g., US and/or EU). Accordingly, the Union-EU would allow data to be stored and processed in any EU region, and allow the public cloud provider to distribute data and process workloads among any EU region. In this manner, the customer can take advantage of the power of the public cloud well beyond what they would otherwise be able to do with their on-premise solution. The DCM of the present disclosure ensures that the EU protected personal data in the customer's database is never allowed to be stored, processed, or accessed outside the EU.

In a second example use case, an EU-based company (customer) includes entities (e.g., subsidiaries, services) located globally. In this example, the customer runs a carbon footprint service based on Internet-of-things (IoT) with smartphone integration. The customer sees the benefits of moving to the public cloud for global coverage and state-of-the-art smartphone integration. In this example, however, the problem is that their global presence exposes their operations to high-risk in unstable parts of the world. In many cases unexpected seizure of personal data can mean much more than a financial loss, it could result in loss of life. The customer decides to migrate their solution to the public cloud, making use of the DCM of the present disclosure to monitor and protect their database. To accomplish this, the customer defines a union (Union-Customer) that allows data to be collected in the public cloud platform edge collectors, and transfers all data encrypted to their EU headquarters in Belgium for processing. Users can access their information from anywhere using a simple browser, and public cloud provider global identity service. In this example, the union can provide that data placement, data movement, and user access can occur in any regions of the public cloud, but that data-key-management, and data processing only occur in Belgium.

By using the data-key-management feature of the DCM, the customer has created a special condition to protect their headquarters from legal regional attempts to seize data collected in a particular region. In the Belgium data center, a third-party (data custodian) can provide data-key-management services critical to decrypting data. Legally, the third-party is not in possession of the data, nor has it been party to the data collection. So, while the customer could be forced to surrender data under warrant, the data cannot be accessed without the data custodian's portion of the key-chain. This may seem to be an extreme case of data seizure, but the world-wide digital landscape is just as volatile as the physical and political landscapes enterprise solution providers are facing.

Figure 5:
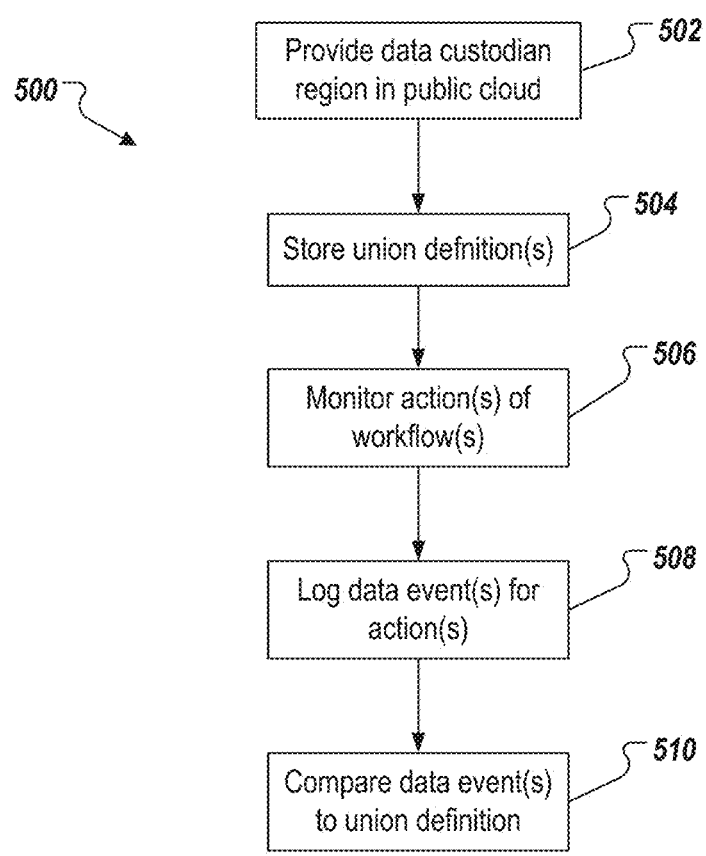
FIG. 5 depicts an example process that can be executed in accordance with implementations of the present disclosure.

FIG. 5 depicts an example process 500 that can be executed in accordance with implementations of the present disclosure. In some examples, the example process 500 can be provided by one or more computer-executable programs executed using one or more computing devices.

A data custodian region is provided within an infrastructure of a public cloud (502). For example, the data custodian region 204 of FIG. 2 is provided in a public cloud provided by a public cloud provider. In some examples, the data custodian region is specific to a customer of an enterprise having one or more computer-implemented services hosted on the public cloud. In some examples, the infrastructure includes a plurality of regional data centers, through which customer data passes and/or is stored, each data center being at a location within a region.

At least one union definition that is used to control one or more of access, transfer, and storage of customer data within respective regional data centers is stored (504). For example, the at least one union definition is stored as a control 214 of FIG. 2 within the data custodian region 204. In some examples, the at least one union definition is provided by a data custodian associated with the customer. For example, the data custodian 320 of FIG. 3 provides the at least one union definition using the DCP 202.

A plurality of actions of respective workflows executed using the one or more computer-implemented services hosted on the public cloud are monitored (506). For each action (e.g., a data access event, a data placement event, a data processing event), a data event is logged within a repository of the data custodian region (508). For example, as a workflow 304 is performed, the actions 302 are executed, each action resulting in the data event that is stored in the repository 210, and provided to the CLR 208. It is determined whether the data event complies with the at least one union definition (510). In response to determining that the data event does not comply with the at least one union definition, providing a notification to a data custodian through a data custodian portal.

Implementations of the present disclosure address scalability of the data custodian platform, which is to be deployed on a global scale, serving various sizes of enterprise. Accordingly, one challenge is to be able to scale as more enterprise data is processed by the data custodian platform. A second dimension of this challenge is that the data custodian platform will be deployed on a public cloud. Consequently, the data custodian platform of the present disclosure is architected as a cloud-native solution, and can be scaled out by provisioning more infrastructure resources/services.

To achieve this, the architecture of the data custodian platform adopts a microservices-based architectural pattern. By architecting the data custodian platform as a set of well-defined and modular microservices, scalability is achieved more granularly. Further, this microservices-based architecture brings additional deployment and operational benefits to the data custodian platform.

To also address scalability, the processing components/services of the data custodian platform are as stateless as possible. In some examples, multiple replicas of individual components can be spun-up as needed to cope with the additional processing workload being exercised. Moreover, this on-demand scaling allows sizing the infrastructure appropriately, so that the data custodian platform can be delivered with cost efficiencies.

Implementations of the present disclosure address multi-cloud authentication/authorization. The data custodian platform can be part of a larger multi-cloud initiative. Therefore, the data custodian platform should be capable of integrating with multiple target cloud platforms. Authentication/authorization of users is an essential part of any secure solution being designed. One of the main challenges in the data custodian platform a multi-cloud solution is to be able to handle multiple authentication/authorization mechanisms.

In some implementations, multi-cloud authentication/authorization enablement in data custodian platform is achieved by multiple means. First, the architecture of the data custodian platform's security framework employs a concept of security providers. In some examples, the security providers supply the underlying implementation, which can be configured on a per-cloud-platform deployment basis. The data custodian platform comes with a number of default security providers. Any additional cloud platform support can be achieved by implementing cloud specific security provider, if default providers are not adequate. Further, implementations of the present disclosure adopt standards-based authentication/authorization mechanisms. In this regard, the data custodian platform uses an OAuth2-based security provider. OAuth2 is a widely adopted technology that will enable the data custodian platform to integrate with a variety of cloud platforms.

Implementations of the present disclosure also address heterogeneous log formats. As described herein, the data custodian platform is driven based on a variety of logs coming from multiple, disparate cloud platforms. The logs are emitted by various layers of the technology stack (e.g., infrastructure services (compute, storage, logging), databases, and applications). Because there is no standard log format, logs from various sources (layers in the technology stack or cloud platforms) will come in variety of structures. The data custodian platform addresses the heterogeneity of these log structures. Additionally, as more log sources or cloud platforms are supported, the data custodian platform must be able to parse new log structures without significant implementation, or redesign overhead.

Implementations of the present disclosure address these challenges using multiple techniques. In some examples, by leveraging modularity coming from adopting the microservices-based architecture, log ingress functionality is isolated in a separate component/service, which interacts with the rest of the system through a well-defined interface. This enable the data custodian platform to isolate log structure heterogeneity into a single smaller component/service, thus shielding the rest of the system from these log structure differences. As another example, the log ingress component/service utilizes a pipeline design pattern. This enables the data custodian platform to not only manage the log structure heterogeneity, but also enables the data custodian platform to incorporate more log formats if the need arises.

Implementations of the present disclosure also address issues with large scale log ingestion and retention. As described herein, the data custodian platform is driven based on a variety of logs coming from the cloud platforms. The logs are emitted by various layers of technology stack (e.g., infrastructure services (compute, storage, logging), databases, and applications). The volume of the logs that need to be ingested will increase as customer's usage of these services increases. The data custodian platform ingests, processes, and stores these logs in order to process customer policies and queries. Implementations of the present disclosure employ efficiency in storing these logs so as not over-burden resources (memory). This becomes particularly important because, as noted above, an in-memory database system (e.g., SAP HANA) is used as the data persistence layer. A large volume of logs results in larger memory footprint required, as well as increasing operation costs.

In view of this, the data custodian of the present disclosure includes a multi-tier storage architecture. In some implementations, the in-memory database system serves as a primary data tier, and enables near real-time insights. In some implementations, a second-tier data store is provided for storing a very large volumes of historical data on disks (e.g., on disks). As described herein, the data custodian platform includes a data ageing component that moves the data from the primary data-tier (the tenant database(s)) to secondary data tier (the historical data store). This alleviates the need to maintain a large memory footprint in a more costly in-memory database system, and reduces the overall operational costs.

In some examples, the data ageing component is policy driven, and configurable to move data beyond a certain threshold (e.g., x number of months) to low-cost second tier data storage. In some examples, the data ageing component is configurable per tenant/customer so that the data custodian platform can provide customer-specific cost versus performance related tradeoff on a per customer or per QoS class basis.

Figure 6:
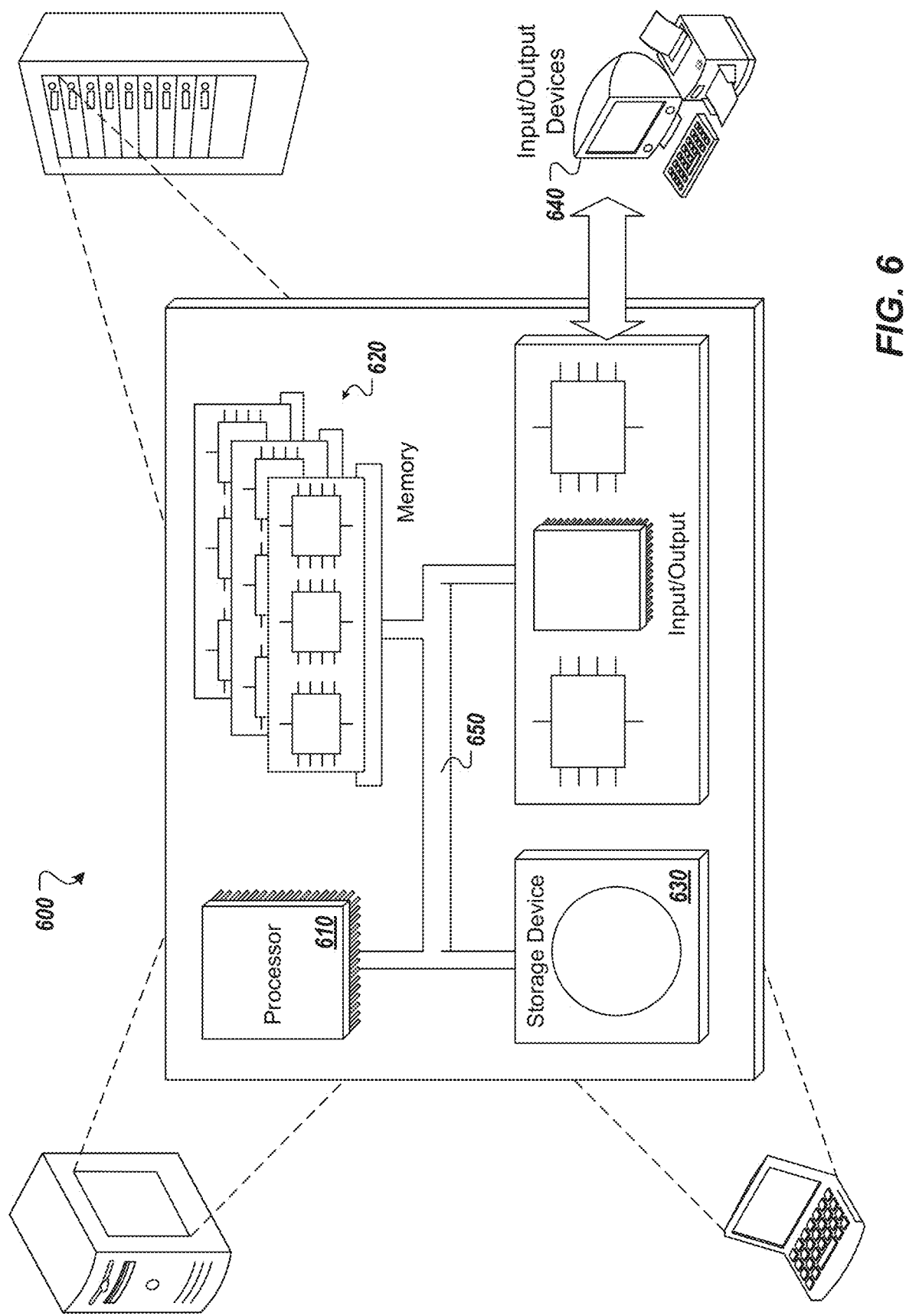
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing governance, risk, and compliance (GRC) in public clouds, the method being executed by one or more processors and comprising:
providing, by the one or more processors, a data custodian region within an infrastructure of a public cloud, the data custodian region being specific to a customer of an enterprise having one or more computer-implemented services hosted on the public cloud, the infrastructure comprising a plurality of regional data centers, through which customer data passes and/or is stored, each data center being at a location within a region;
storing, by the one or more processors, at least one union definition that is used to control one or more of access, transfer, and storage of customer data within respective regional data centers, the at least one union definition being provided by a data custodian associated with the customer;
providing, within the data custodian region, a zone exclusively accessed by the data custodian;
monitoring, by the one or more processors, a plurality of actions of respective workflows executed using the one or more computer-implemented services hosted on the public cloud;
for each action, logging, by the one or more processors, a data event within a repository of the data custodian region; and
determining, by the one or more processors, whether the data event complies with the at least one union definition.

2. The method of claim 1, further comprising, in response to determining that the data event does not comply with the at least one union definition, providing a notification to a data custodian through a data custodian portal.

3. The method of claim 2, wherein the data custodian portal communicates with the repository through a computer-executed connector of the data custodian region.

4. The method of claim 1, wherein the repository comprises a customer log repository that receives data events from a log repository of a respective computer-implemented service.

5. The method of claim 1, wherein one or more of private computing, and data key management are executed within the zone.

6. The method of claim 1, wherein the at least one union definition is further used to control one or more of processing of customer data, data key management, and private computing within respective regional data centers.

7. A non-transitory computer-readable storage medium coupled to one or more processors and having instructions stored thereon which, when executed by the one or more processors, cause the one or more processors to perform operations for managing governance, risk, and compliance (GRC) in public clouds, the operations comprising:
providing a data custodian region within an infrastructure of a public cloud, the data custodian region being specific to a customer of an enterprise having one or more computer-implemented services hosted on the public cloud, the infrastructure comprising a plurality of regional data centers, through which customer data passes and/or is stored, each data center being at a location within a region;
storing at least one union definition that is used to control one or more of access, transfer, and storage of customer data within respective regional data centers, the at least one union definition being provided by a data custodian associated with the customer;
providing, within the data custodian region, a zone exclusively accessed by the data custodian;
monitoring a plurality of actions of respective workflows executed using the one or more computer-implemented services hosted on the public cloud;
for each action, logging a data event within a repository of the data custodian region; and
determining whether the data event complies with the at least one union definition.

8. The computer-readable storage medium of claim 7, wherein operations further comprise, in response to determining that the data event does not comply with the at least one union definition, providing a notification to a data custodian through a data custodian portal.

9. The computer-readable storage medium of claim 8, wherein the data custodian portal communicates with the repository through a computer-executed connector of the data custodian region.

10. The computer-readable storage medium of claim 7, wherein the repository comprises a customer log repository that receives data events from a log repository of a respective computer-implemented service.

11. The computer-readable storage medium of claim 7, wherein one or more of private computing, and data key management are executed within the zone.

12. The computer-readable storage medium of claim 7, wherein the at least one union definition is further used to control one or more of processing of customer data, data key management, and private computing within respective regional data centers.

13. A system, comprising:
   a computing device; and
   a computer-readable storage device coupled to the computing device and having instructions stored thereon which, when executed by the computing device, cause the computing device to perform operations for managing governance, risk, and compliance (GRC) in public clouds, the operations comprising:
      providing a data custodian region within an infrastructure of a public cloud, the data custodian region being specific to a customer of an enterprise having one or more computer-implemented services hosted on the public cloud, the infrastructure comprising a plurality of regional data centers, through which customer data passes and/or is stored, each data center being at a location within a region;
      storing at least one union definition that is used to control one or more of access, transfer, and storage of customer data within respective regional data centers, the at least one union definition being provided by a data custodian associated with the customer;
      providing, within the data custodian region, a zone exclusively accessed by the data custodian;
      monitoring a plurality of actions of respective workflows executed using the one or more computer-implemented services hosted on the public cloud;
      for each action, logging a data event within a repository of the data custodian region; and
      determining whether the data event complies with the at least one union definition.

14. The system of claim 13, wherein operations further comprise, in response to determining that the data event does not comply with the at least one union definition, providing a notification to a data custodian through a data custodian portal.

15. The system of claim 14, wherein the data custodian portal communicates with the repository through a computer-executed connector of the data custodian region.

16. The system of claim 13, wherein the repository comprises a customer log repository that receives data events from a log repository of a respective computer-implemented service.

17. The system of claim 13, wherein one or more of private computing, and data key management are executed within the zone.

* * * * *